US005882773A

United States Patent [19]

Chow et al.

[11] Patent Number: 5,882,773

[45] Date of Patent: Mar. 16, 1999

[54] OPTICAL COATINGS OF VARIABLE REFRACTIVE INDEX AND HIGH LASER-RESISTANCE FROM PHYSICAL-VAPOR-DEPOSITED PERFLUORINATED AMORPHOUS POLYMER

[75] Inventors: Robert Chow; Gary E. Loomis; Ian M. Thomas, all of Livermore, Calif.

[73] Assignee: The Regents of the University of California, Oakland, Calif.

[21] Appl. No.: 901,641

[22] Filed: Jul. 28, 1997

Related U.S. Application Data

[63] Continuation of Ser. No. 639,147, Apr. 29, 1996, abandoned, which is a continuation of Ser. No. 373,904, Jan. 17, 1995, abandoned, which is a continuation of Ser. No. 135,891, Oct. 13, 1993, abandoned.

[51] Int. Cl.[6] .......... B32B 7/02

[52] U.S. Cl. .......... 428/212; 428/332; 428/336; 428/409; 428/411.1; 428/421; 428/422; 359/580; 359/586; 359/601

[58] Field of Search .......... 428/212, 332, 428/336, 409, 411.1, 421, 422, 426, 441, 446, 451; 359/580, 586, 589, 601, 609

[56] References Cited

U.S. PATENT DOCUMENTS

| | | | |
|---|---|---|---|
| 4,545,646 | 10/1985 | Chern et al. | 350/162.2 |
| 4,657,805 | 4/1987 | Fukumitsu et al. | 428/215 |
| 4,859,536 | 8/1989 | Waddell et al. | 428/408 |
| 4,925,259 | 5/1990 | Emmett | 350/1.6 |
| 4,977,025 | 12/1990 | Squire | 428/421 |
| 5,061,024 | 10/1991 | Keys | 359/350 |
| 5,139,879 | 8/1992 | Aharoni et al. | 428/422 |
| 5,246,767 | 9/1993 | Agou et al. | 428/212 |
| 5,286,567 | 2/1994 | Kubota et al. | 428/422 |
| 5,296,283 | 3/1994 | Froggatt | 428/204 |
| 5,392,156 | 2/1995 | Kumagai et al. | 359/586 |

*Primary Examiner*—Marie Yamnitzky
*Attorney, Agent, or Firm*—L. E. Carnahan

[57] ABSTRACT

Variable index optical single-layers, optical multilayer, and laser-resistant coatings were made from a perfluorinated amorphous polymer material by physical vapor deposition. This was accomplished by physically vapor depositing a polymer material, such as bulk Teflon AF2400, for example, to form thin layers that have a very low refractive index (~1.10–1.31) and are highly transparent from the ultra-violet through the near infrared regime, and maintain the low refractive index of the bulk material. The refractive index can be varied by simply varying one process parameter, either the deposition rate or the substrate temperature. The thus forming coatings may be utilized in anti-reflectors and graded anti-reflection coatings, as well as in optical layers for laser-resistant coatings at optical wavelengths of less than about 2000 nm.

14 Claims, 1 Drawing Sheet

OPTICAL COATINGS OF VARIABLE REFRACTIVE INDEX AND HIGH LASER-RESISTANCE FROM PHYSICAL-VAPOR-DEPOSITED PERFLUORINATED AMORPHOUS POLYMER

This is a Continuation of application Ser. No. 08/639,147 filed Apr. 29, 1996, which is a continuation of 08/373,904, filed Jan. 17, 1995, which is a continuation of 08/373,8981, filed Oct. 13, 1993 (now all abandoned).

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention is directed to transparent and variable refractive index coatings, particularly to the fabrication of such coatings from a copolymer of two or more of the following monomers: tetrafluoroethylene, 2,2-bistrifluoromethyl-4,5 difluoro-1,3 dioxole, perfluoroallyl vinyl ether, and perfluorobutenyl vinyl ether, hereafter referred to as a "perfluorinated amorphous polymer", and more particularly to variable index optical single layers and multilayers, and laser-damage-resistant coatings formed by physical-vapor-deposited perfluorinated amorphous polymers (PAP).

Various types of optical coatings have been developed for different applications, and numerous processes have been developed over the years. These prior efforts are exemplified by U.S. Pat. Nos. 4,545,646 issued Oct. 8, 1985 to M. Chern et al.; and U.S. Pat. No. 4,925,259 issued May 15, 1990 to J. L. Emmett.

Polymer materials have been widely used for coatings. Perfluorinated amorphous polymer coatings have been used as thermal barriers, microelectronics insulators, and in doped optical fibers. However, there has been a need for alternate optical coating materials for use in the ultra-violet (UV), visible, and near-infrared (NIR) regime due to a shortage of dielectrics with a low refractive index. Also, with the continuing development of high energy laser systems, there is a need for high laser-damage-resistant optical coatings operating at optical wavelengths of less than 2000 nm.

This prior need has been satisfied by the present invention by the recognition that single layers of polymer materials, such as perfluorinated amorphous polymers (PAP), can be physical-vapor-deposited from bulk perfluorinated amorphous polymers, which are highly transparent in the UV-visible-NIR regime and also has a low refractive index. Also, by this invention, optical multilayers can be made by physical-vapor-deposited PAP with other physically-vapor-deposited dielectric materials. Also, by this invention the refractive index of the optical layers may be varied by simply varying the deposition rate. Thus, transparent optical coatings having a refractive index in the about 1.10–1.30 range have been produced by this invention. Thus, multilayered optical reflectors have been made by this invention.

SUMMARY OF THE INVENTION

It is an object of the present invention to provide an optical coating which has a variable index and a high laser-damage-resistance.

A further object of the invention is to produce such coating from a physical-vapor-deposited perfluorinated amorphous polymer.

Another object of the invention is to produce a highly transparent optical coating for use in the ultra-violet, visible, and near infrared regime having a refractive index that can be varied by merely varying the deposition rate of the perfluorinated amorphous polymer or the temperature of the substrate during the deposition process.

Another object of the invention is to produce high laser-damage-resistant optical coatings from an perfluorinated amorphous polymer material.

Another object of the invention is to produce optical multilayers with physically-vapor-deposited perfluorinated amorphous polymer as one of the constituent layers, with the other layers being other physically-vapor-deposited dielectric materials such as oxides, fluorides, sulfides and selenides.

Another object of the invention is to produce a broadband anti-reflection coating on non-absorbing substrates having refractive indices between 1.35 and 1.69 using physically-vapor-deposited perfluorinated amorphous polymer.

Other objects and advantages will become apparent from the following description and accompanying drawing. The present invention involves the formation of variable index optical single-layer and multilayered coatings, and other laser-resistant coatings by physical-vapor-deposition of a polymer material, such as a perfluorinated amorphous polymer, such as bulk Teflon AF. Also, by use of physical-vapor deposition of the perfluorinated amorphous polymer, the process parameters may be varied to produce coatings that are less dense and therefore have an even lower refractive index than the bulk perfluorinated amorphous polymer. High transparency coatings have been produced with a refractive index in the range of about 1.10-1.30. During experimental verification of this invention, single layers of perfluorinated amorphous polymer, having a thickness of ~1500Å for use in the visible regime, were deposited in a vacuum chamber with a simple resistance heater. The adhesion, transmittance, and refractive indices of the coatings were determined as a function of the deposition rate, substrate temperature, and glow-discharge bias potential. The coatings produced by this invention may be used as optical coatings in the UV-visible-NIR regimes, as well as in applications requiring a variable refractive index, such as rugate filters and graded anti-reflection coatings, as well as for laser-damage-resistant coatings such as reflectors, polarizers, and filters, in operating wavelength regimes for less than 2000 nm. Thus, by this invention, perfluorinated amorphous polymer coatings, primarily utilized in numerous non-optical applications, have been made into optical and laser-damage-resistant coatings, thus greatly expanding the use capability of polymer materials, such as Teflon AF.

BRIEF DESCRIPTION OF THE DRAWINGS

The accompanying drawings, which are incorporated into and form a part of the disclosure, serve to illustrate the invention and, together with the description, serve to explain the principles of the invention.

DETAILED DESCRIPTION OF THE INVENTION

Figure 1:
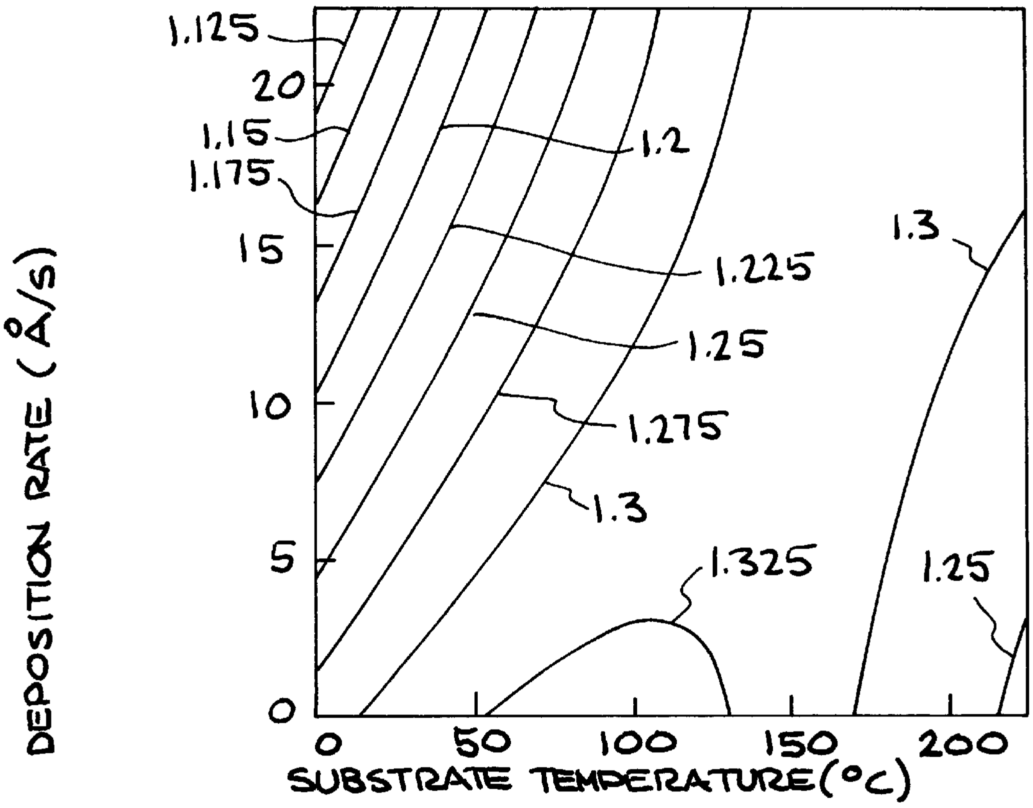
FIG. 1 illustrates iso-refractive index surface contours as a function of deposition rate and substrate temperature.

The present invention is directed to the formation of variable index optical single-layer and multilayers, and laser-damage-resistant coatings from physical-vapor-deposited polymer material, such as perfluorinated amorphous polymer (PAP) material. The perfluorinated amorphous polymer material utilized in verifying the invention was Teflon AF2400, a bulk perfluorinated amorphous polymer, made by E. I. Du Pont and Co., and the bulk material was physically-vapor-deposited to form thin layers (100 to 3000Å) that were characterized optically and mechanically. While Teflon is known by the generic term tetrafluoroethylene, no generic term is known for Teflon AF, made by Du Pont, but is an amorphous fluoropolymer (AF). Bulk perfluorinated amorphous polymers are highly transparent in the ultra-violet (UV), visible, and near infrared (NIR) regime, and they also have a low refractive index (~1.31). The optical properties of the coatings produced by the physical-vapor-deposition process are similar to that of the bulk perfluorinated amorphous polymer material. The coatings are transparent from the UV (200 nm) through to the NIR (1200 nm), and the majority of coatings have a 1.30 refractive index, similar to that of the bulk material. However, for the lower substrate temperature range, the refractive indices of the coatings noticably decreased with increasing deposition rate, and a coating with a refractive index of as low as 1.16 was obtained. The refractive index variation was also observed at the higher substrate temperature range. The thus produced coatings adhered to fused silicon and silicon wafers under normal handling conditions. By the process of this invention, variation of the refractive index can be achieved simply by varying a process parameter, the deposition rate.

During experimental verification of the physical-vapor-deposition process using bulk perfluorinated amorphous polymer, coatings with thicknesses (~1500Å) used in the visible regime were fabricated and the characteristics measured. A Box-Behnkem experimental strategy (3-factor uniform shell design for quadratic interpolation) was used to examine the relationship between the process parameters and the material properties. The deposition rates were set at 2, 11 and 20Å/S. The substrate temperatures were set at 20°, 110° and 200° C. The substrate platen or glow-discharge potential was biased at −1500, zero, and +1500 volts in a pre-coating glow discharge procedure, attempting to vary the adhesion of the coatings. Single layers of perfluorinated amorphous polymer as desibed above were deposited in a vacuum chamber with a simple resistance heater. The thickness of the coatings in this series ranged from 1000 to 3000Å. The deposition rate may vary from 2–200Å/S. The transmittances, adhesion, and refractive indices of the coatings were determined as a function of deposition rate, substrate temperature, and glow discharge. The transmittances were measured on a Cary spectrophotometer. The refractive index and thickness were determined on a Rudolf Research Auto El II-NIR-3 ellipsometer.

By this series of experiments, it was determined that the optical properties of the thus formed coatings were similar to that of the bulk material. These coatings were found to be transparent from the ultra-violet (200 nm) through the near infrared (1200 nm). The coatings adhered to the substrates under normal conditions, but could be pulled off the fused silica substrates by using a tape with a 12.6 gr/mm tension. The majority of the coatings had a 1.30 refractive index, similar to that of the bulk material. However, for the lower substrate temperature range, the refractive indices of the coating decreased with increasing deposition rate, and a coating with a refractive index as low as 1.16 was obtained, thus verifying that coatings with a variable refractive index can be produced by this invention by varying the deposition rate. Therefore, highly transparent, variable index optical single layers and multilayers can be made using only one material.

The following table sets forth the above-referenced experiment runs using bulk Teflon AF2400, and sets forth the measured refractive indices and thicknesses:

TABLE I

| Temp °C. | Rate A/s | Glow Disch Volts | Refractive Index Measured At 4050 Å | 6330 Å | 8300 Å | Thickness (Å) Measured At 4050 Å | 6330 Å | 8300 Å |
|---|---|---|---|---|---|---|---|---|
| 110 | 11 | 0 | 1.308 | 1.307 | 1.305 | 1353 | 1354 | 1349 |
| 20 | 2 | 0 | 1.263 | 1.257 | 1.263 | 1489 | 1497 | 1489 |
| 200 | 11 | 1500 | 1.173 | 1.294 | 1.3 | 2296 | 1817 | 1819 |
| 110 | 2 | 1500 | 1.23 | 1.306 | 1.305 | 1451 | 1432 | 1431 |
| 20 | 11 | 1500 | | 1.199 | 1.216 | | 2440 | 2332 |
| 20 | 20 | 0 | 1.097 | 1.157 | 1.168 | 2729 | 2274 | 2235 |
| 110 | 2 | −1500 | 1.295 | 1.309 | 1.308 | 1237 | 1207 | 1200 |
| 200 | 20 | 0 | 1.308 | 1.307 | 1.305 | 1322 | 1338 | 1308 |
| 20 | 11 | 1500 | 1.184 | 1.216 | 1.219 | 1829 | 1720 | 1724 |
| 200 | 2 | 0 | 1.305 | 1.303 | 1.303 | 1244 | 1248 | 1241 |
| 110 | 20 | −1500 | 1.283 | 1.298 | 1.298 | 1372 | 1321 | 1317 |
| 110 | 20 | 1500 | 1.292 | 1.302 | 1.302 | 1547 | 1527 | 1525 |
| 20 | 1.1 | 0 | 1.288 | 1.277 | 1.286 | 1000 | 1077 | 1030 |

FIG. 1 illustrates the iso-refractive index (at 6330Å) contour as a function of the deposition rate (Å/s) and substrate temperature (°C.). The surface was determined from a quadratic fit of the data using regression analysis.

Utilizing this invention, high laser-damage-resistant anti-refractive coatings were made from a perfluorinated amorphous polymer (Teflon AF2400) material by physical vapor deposition. As in the above experimental description, single layers of perfluorinated amorphous polymer were thermally deposited in a vacuum chamber. The transmittance and refractive indices were determined as set forth above. It was found that an anti-reflective coating of the physical-vapor-deposited perfluorinated amorphous polymer had a laser-damage-resistance of >47j/cm$^2$ (1.06 $\mu$m, 3-ns pulselength). Single surface reflections as low as 0.5% or less were obtained on these anti-reflection coatings. These coatings were also transparent from 200 nm to 1200 nm. Based on these initial tests, it appears that the coatings of this invention may be transparent at other optical wavelengths greater than 1200 nm, possibly about 2000 nm, but such has not yet been experimentally verified. Scanning electron microscopy and nuclear magnetic resonance observations indicate that morphological changes causes the variations in the refraction index rather than compositional changes. As pointed out above, the thus fabricated high laser-damage-resistant anti-reflective coatings adhered to fused silica and silicon wafers under normal handling conditions.

Figure 2:
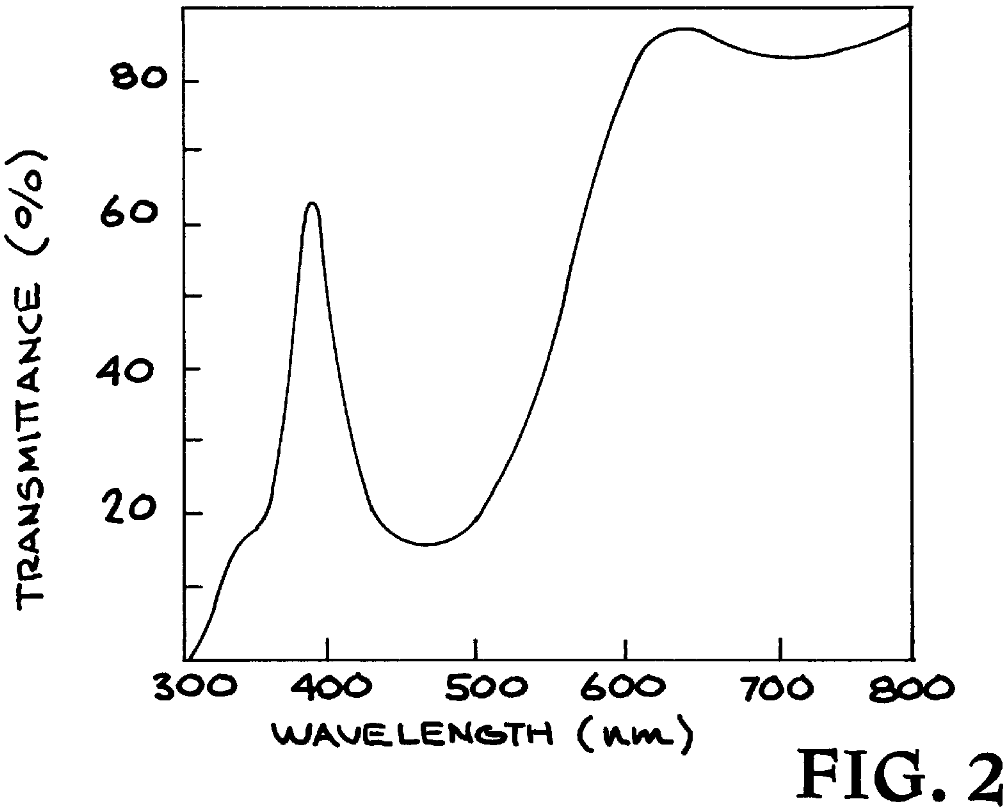
FIG. 2 illustrates the use of an optical multilayer in a reflector design, made by physically-vapor-deposited materials, one of which is a perfluorinated amorphous polymer.

FIG. 2 illustrates the use of a physical-vapor-deposited perfluorinated amorphous polymer and another dielectric material in an optical multilayer, more specifically an optical reflector using the reflector design: BK-7 (HL)$^3$H Air, where H=ZnS and L=Teflon AF2400. The layers in the reflector adhered to the substrate and to each other. Therefore, other optical multilayers can be made by physical-vapor-deposited of perfluorinated amorphous polymer with other dielectric materials.

To exemplify the invention in greater detail, the following sets forth a brief description of a specific apparatus utilized in the physical-vapor-deposition technique in carrying out this invention, and a specific operational sequence, using exemplified vacuum conditions, materials, deposition times, temperatures, energies, etc., which produce a coating having an exemplified thickness and refractive index.

The apparatus, while well known in the field of physical vapor deposition, may comprise a stainless steel bell jar connected by a pumping manifold to a liquid-nitrogen baffled diffusion pump. The diffusion pump is backed by a mechanical roughing pump. This vacuum coating chamber routinely had a base pressure in the mid $10^{-7}$ Torr range. The chamber is equipped with quartz lamps for heating the substrates, a vibrating crystal head for monitoring the rate and coating thickness, and a tungsten filament for heating the crucible. A crucible containing the charge of perfluorinated amorphous polymer was resistance heated until the perfluorinated amorphous polymer boiled. The heater power was then adjusted to give the proper deposition rate, as determined by a crystal rate monitor. The shutter, between the crucible and the substrates, was opened to allow the evaporated perfluorinated amorphous polymer to reach the substrate.

An example of the operation sequence for producing a coating of specified thickness and refractive index on a selected substrate, is as follows:

1. Select a substrate composed of polished fused silica, silicon wafer, or another suitably polished material.
2. Clean the substrate with alcohol in a class 1000 environment.
3. Load the substrates into the vacuum chamber and pump down to a base pressure below $1\times10^{-6}$ Torr.
4. Set the heat lamps to obtain the proper substrate temperature.
5. Boil the perfluorinated amorphous polymer with the shutter closed.
6. Adjust the power to the crucible heater to obtain a specified evaporation rate.
7. Open the shutter and monitor the thickness.
8. When the coating reaches a given thickness, the shutter closes over the crucible.

It has thus been shown that the present invention enables the use of polymer materials, such as perfluorinated amorphous polymers, to be utilized as optical coatings for use in the ultra-violet, visible, and near infrared regime, thereby greatly expanding the use of perfluorinated amorphous polymer materials for highly transparent, low refractive index applications. In addition, the invention enables the formation of such coatings having a variable refraction index that remains highly transparent. Also, the coatings formed by this invention may be utilized as high laser-damage-resistant anti-reflective coatings and are transparent at optical wavelengths less than about 2000 nm. The coatings produced by this invention may be utilized in ultra-violet regime applications, such anti-reflectors and graded anti-reflection coatings.

While particular materials, parameters, apparatus, etc. has been described to illustrate the principle features of this invention, such are not intended to limit the scope of the invention. Modifications and changes will become apparent to those skilled in the art, and it is intended that the invention be limited only by the scope of the appended claims.

We claim:

1. An optical multilayered coating having a refractive index of about 1.10 to about 1.30, made by a process which includes:

selecting a transparent perfluorinated amorphous polymer material;

forming layers of the polymer material on a substrate by a physical vapor deposition technique;

the physical vapor deposition being carried out by varying at least one of the group consisting of the deposition rate, the substrate temperature, and the glow-discharge bias potential; and wherein a variable index optical multilayer coating is formed by varying the deposition rate of at least certain of the layers formed by the physical deposition technique.

2. The coating of claim 1, which is transparent from the ultraviolet through the near infrared regimes, and having an individual layer thickness in the range of 100 to 3000 Å.

3. An optical multilayer coating composed of layers of polymer material and layers of a dielectric material, made by a process which includes:

selecting a transparent perfluorinated amorphous polymer material;

selecting a dielectric material;

forming layers of the polymer material and layers of the dielectric material on a substrate by a physical vapor deposition technique;

the physical vapor deposition of the polymer material being carried out by varying at least one of the group consisting of the deposition rate, the substrate temperature, and the glow-discharge bias potential; and wherein a variable index optical multilayer coating is formed by varying the deposition rate of at least certain of the polymer material layers formed by the physical deposition technique such that at least one layer of the polymer material has a refractive index that is different than the refractive index of at least one other layer of the polymer material in the multilayer.

4. The coating of claim 3, wherein at least one of the layers of the dielectric material is selected from the group consisting of oxides, fluorides, sulfides, and selenides.

5. The coating of claim 4, wherein the perfluorinated amorphous polymer is a copolymer of tetrafluoroethylene in mole % from 40% to 90%, with 2,2 bistrifluoromethyl-4,5 difluoro-1,3 dioxole in mole % from 60% to 10%.

6. A transparent, optical multilayer and laser-damage resistant coating consisting of layers of a physical-vapor-deposited transparent perfluorinated amorphous polymer material, at least one of said layers having a refractive index different than the refractive index of at least one other of said layers, thereby providing a variable index of refraction, said coating having a index of refraction in the range of about 1.10 to about 1.30.

7. The coating of claim 6, wherein the index of refraction of the layers of the multilayer coating is varied by changing the deposition rate of perfluorinated amorphous polymer material in at least certain of the layers forming the multilayer coating.

8. The coating of claim 6, wherein the perfluorinated amorphous polymer is a copolymer of tetrafluoroethylene, 2,2-bistrifluoromethyl-4,5 difluoro-1,3 dioxole.

9. The coating of claim 6, wherein the index of refraction varies across the optical multilayer.

10. The coating of claim 6, wherein each of the layers of the multilayer coating has a different refractive index.

11. The coating of claim 6, wherein the index of refraction of alternating layers is different.

12. The coating of claim 6, wherein the index of refraction across the overall optical multilayer is graded.

13. The coating of claim 6, wherein each of said layers within the optical multilayer is constructed to produce an index of refraction in the range of 1.10 to 1.30 in each layer of the coating.

14. The coating of claim 6, wherein the index of refraction of the layers of the multilayer coating may be alternating, non-alternating, or graded.

* * * * *